US012565258B2

(12) United States Patent　　　　　(10) Patent No.: US 12,565,258 B2
Tazuke et al.　　　　　　　　　　　　(45) Date of Patent: Mar. 3, 2026

(54) RUDDER SYSTEM

(71) Applicants:DENSO CORPORATION, Kariya (JP); JTEKT CORPORATION, Kariya (JP)

(72) Inventors: Kurumi Tazuke, Kariya (JP); Hiroki Tomizawa, Kariya (JP); Hisashi Kameya, Kariya (JP); Toshimitsu Sakai, Kariya (JP); Masaharu Yamashita, Toyota (JP); Kenji Shibata, Nagoya (JP); Yosuke Yamashita, Nagoya (JP); Shintaro Takayama, Toyota (JP); Toshihiro Takahashi, Nishio (JP); Yuji Fujita, Okazaki (JP); Kenichi Abe, Okazaki (JP); Yugo Nagashima, Anjo (JP)

(73) Assignees: DENSO CORPORATION, Kariya (JP); JTEKT CORPORATION, Kariya (JP)

( * ) Notice: Subject to any disclaimer, the term of this patent is extended or adjusted under 35 U.S.C. 154(b) by 453 days.

(21) Appl. No.: 18/172,995

(22) Filed: Feb. 22, 2023

(65) Prior Publication Data

US 2023/0202553 A1　　　Jun. 29, 2023

Related U.S. Application Data

(63) Continuation-in-part of application No. PCT/JP2021/031345, filed on Aug. 26, 2021.

(30) Foreign Application Priority Data

Aug. 27, 2020　(JP) ................................. 2020-143535

(51) Int. Cl.
　　B62D 5/04　　　(2006.01)
　　B62D 6/00　　　(2006.01)

(52) U.S. Cl.
　　CPC ............... B62D 5/046 (2013.01); B62D 6/00 (2013.01)

(58) Field of Classification Search
　　CPC .................................. B62D 5/046; B62D 6/00
　　See application file for complete search history.

(56) References Cited

U.S. PATENT DOCUMENTS

2015/0291208 A1　10/2015　Miyasaka
2019/0322312 A1　10/2019　Okano et al.
2020/0331522 A1*　10/2020　Yamashita ............. B62D 5/046

FOREIGN PATENT DOCUMENTS

JP　　　2007069849 A　　3/2007
JP　　　　4848717 B2　12/2011
JP　　　2021-136735 A　　9/2021

* cited by examiner

*Primary Examiner* — Jacob D Knutson
(74) *Attorney, Agent, or Firm* — Maschoff Brennan

(57) ABSTRACT

A steer-by-wire rudder system includes a first system having a first motor unit that drives a rudder mechanism and a first control unit that controls the first motor unit, and a second system having a second motor unit that drives the rudder mechanism and a second control unit that controls the second motor unit. The first control unit and the second control unit perform cooperative control for controlling the first motor unit and the second control unit to cooperate with each other. When the cooperative control is not performed, one of the control of the first motor unit by the first control unit and the control of the second motor unit by the second control unit continues, and the other thereof stops.

13 Claims, 4 Drawing Sheets

RUDDER SYSTEM

CROSS REFERENCE TO RELATED APPLICATIONS

This application is a continuation-in-part application of International Patent Application No. PCT/JP2021/031345 filed on Aug. 26, 2021, which designated the U.S. and based on and claims the benefits of priority of Japanese Patent Application No. 2020-143535 filed on Aug. 27, 2020. The entire disclosure of all of the above applications is incorporated herein by reference.

TECHNICAL FIELD

The present disclosure relates to a rudder system that includes a plurality of systems, each of which has motor unit and control unit.

BACKGROUND

Conventionally, a rudder system has a first reaction force ECU that performs reaction force control for a first turning reaction force motor, a second reaction force ECU that performs reaction force control for a second turning reaction force motor, a first turning ECU that performs turning control for a first turning motor, and a second turning ECU that performs turning control for a second turning motor.

SUMMARY

In a rudder system including a plurality of systems, each of which has motor unit and control unit, a driving of a rudder mechanism is appropriately continued when cooperative control is not performed.

In a steer-by-wire rudder system including a first system having a first motor unit for driving a rudder mechanism and a first control unit for controlling the first motor unit, a second system having a second motor unit for driving the rudder mechanism and a second control unit for controlling the second motor unit, the first control unit and the second control unit perform cooperative control to control the first motor unit and the second motor unit to cooperate, and when the cooperative control is not performed, one of the control of the first motor unit by the first control unit and the control of the second motor unit by the second control unit continues, and the other thereof stops.

BRIEF DESCRIPTION OF DRAWINGS

The above features of the present disclosure will become more apparent from the following detailed description made with reference to the accompanying drawings.

In the drawings.

DETAILED DESCRIPTION

Figure 1:
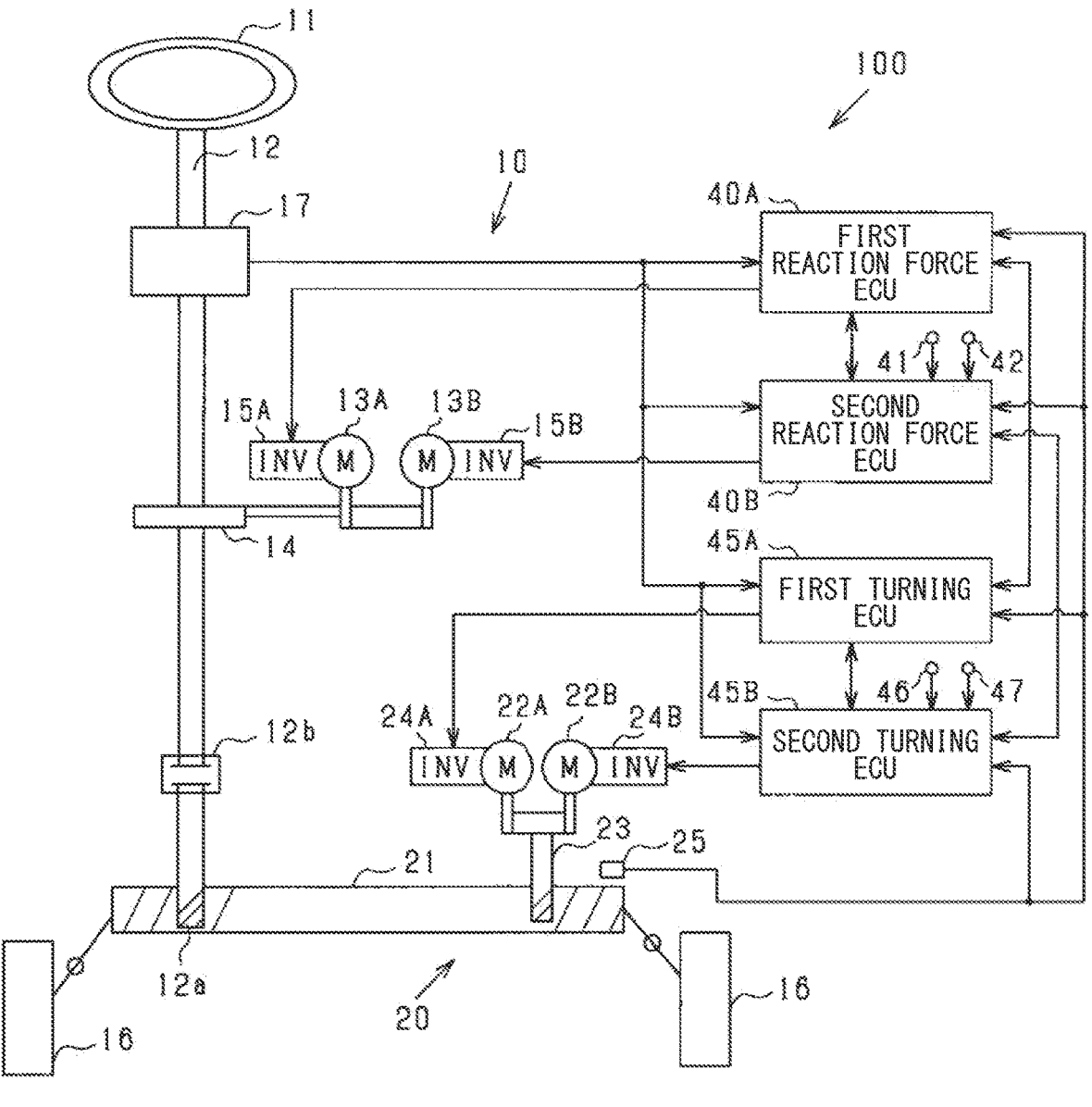
FIG. 1 is a schematic diagram of a steering system.

In an assumable example, a rudder system has a first reaction force ECU that performs reaction force control for a first turning reaction force motor, a second reaction force ECU that performs reaction force control for a second turning reaction force motor, a first turning ECU that performs turning control for a first turning motor, and a second turning ECU that performs turning control for a second turning motor. In the rudder system, when one of the two turning reaction force motors fails (does not operate properly or does not operate at all), control is continued by one normal turning reaction force motor, and when one of two turning motors fails, control is continued by one normal turning motor.

By the way, in the rudder system, cooperative control is performed on two turning reaction force motors (motor units) in reaction force control, and cooperative control is performed on two turning motors (motor units) in turning control. A disclosing person of the present disclosure focuses on a possibility that a rudder mechanism driven by the motor may vibrate or lock when cooperative control cannot be performed even if the motor does not fail. In this respect, the rudder system can continue control when one of the two motors fails, but when cooperative control becomes impossible, there is a possibility that the driving of the rudder mechanism cannot be continued appropriately.

The above situation is generally common not only in the rudder system having two motors, but also in a case where cooperative control is performed on two windings (motor units) of a double-winding motor.

In a rudder system including a plurality of systems, each of which has motor unit and control unit, a driving of a rudder mechanism is appropriately continued when cooperative control is not performed.

As for a first means, in a steer-by-wire rudder system including a first system having a first motor unit for driving a rudder mechanism and a first control unit for controlling the first motor unit, a second system having a second motor unit for driving the rudder mechanism and a second control unit for controlling the second motor unit, the first control unit and the second control unit perform cooperative control to control the first motor unit and the second motor unit to cooperate, and when the cooperative control is not performed, one of the control of the first motor unit by the first control unit and the control of the second motor unit by the second control unit continues, and the other thereof stops.

According to the above configuration, the rudder system includes the first system and the second system. The first system includes the first motor unit that drives the rudder mechanism and the first control unit that controls the first motor unit. The second system includes the second motor unit that drives the rudder mechanism and the second control unit that controls the second motor unit. The first control unit and the second control unit perform cooperative control to control the first motor unit and the second motor unit to cooperate. Therefore, it is possible to suppress an occurrence of vibration of the rudder mechanism and locking of the rudder mechanism.

Here, if the control of the first motor unit by the first control unit and the control of the second motor unit by the second control unit are continued when the cooperative control cannot be performed, an occurrence of vibration of the rudder mechanism and locking of the rudder mechanism may occur. When the cooperative control is not performed, one of the control of the first motor unit by the first control unit and the control of the second motor unit by the second control unit continues, and the other thereof stops. Therefore, it is possible to suppress an occurrence of vibration of the rudder mechanism and locking of the rudder mechanism. When cooperative control cannot be performed, the driving of the rudder mechanism can be appropriately continued.

Even if the first control unit can continue to control the first motor unit and the second control unit can continue to control the second motor unit, there are cases where cooperative control cannot be performed. In this case, if the control of the first motor unit by the first control unit and the control of the second motor unit by the second control unit are continued when the cooperative control cannot be performed, an occurrence of vibration of the rudder mechanism and locking of the rudder mechanism may occur.

In this regard, in a second means, when the first control unit can continue to control the first motor unit, the second control unit can continue to control the second motor unit, and cooperative control cannot be performed, one of the control of the first motor unit by the first control unit and the control of the second motor unit by the second control unit is continued, and the other control is stopped. Therefore, when there is a risk of vibration of the rudder mechanism or locking of the rudder mechanism, the occurrence of vibration of the rudder mechanism or locking of the rudder mechanism can be suppressed.

In a third means, the first control unit continues control of the first motor unit when the cooperative control cannot be performed, and the second control unit stops controlling the second motor unit under condition that it is determined that the cooperative control cannot be performed and that the control of the first motor unit by the first control unit can be continued.

According to the above configuration, the first control unit continues the control of the first motor unit when cooperative control cannot be performed. Therefore, even if cooperative control cannot be performed, driving of the rudder mechanism can be continued. The second control unit stops controlling the second motor unit on condition that it is determined that cooperative control cannot be performed and that the control of the first motor unit by the first control unit can be continued. That is, even if cooperative control cannot be performed, the second control unit does not stop the control of the second motor unit when it is not determined that the control of the first motor unit by the first control unit can be continued. Therefore, when cooperative control becomes impossible, it is possible to prevent the first control unit from performing none of the control of the first motor unit and the second control unit from performing none of the control of the second motor.

In a fourth means, the first control unit and the second control unit transmit and receive information necessary for the cooperative control through communication, and a case where the cooperative control cannot be performed is a case where the first control unit and the second control unit are incapable of communicating with each other.

According to the above configuration, the first control unit and the second control unit mutually transmit and receive information necessary for the cooperative control through communication. When the first control unit and the second control unit are incapable of communicating with each other, the cooperative control cannot be performed, and the first control unit and the second control unit cannot know whether or not the other is continuing control. In this respect, when the first control unit and the second control unit are incapable of communicating with each other, it is possible to continue driving the rudder mechanism while suppressing the vibration of the rudder mechanism.

In a fifth means, a voltage detection unit for detecting a voltage supplied to the first motor unit is provided, and the second control section determines that the control of the first motor unit by the first control unit can be continued on a condition that a voltage detected by the voltage detection unit exceeds a threshold value.

According to the above configuration, the voltage detection unit detects the voltage supplied to the first motor unit. The second control unit determines that the control of the first motor unit by the first control unit can be continued on condition that the voltage detected by the voltage detection unit exceeds the threshold value. Therefore, even if the first control unit and the second control unit are incapable of communicating with each other, it is possible to determine whether or not the control of the first motor unit by the first control unit can be continued.

In a sixth means, a disconnection detection unit for detecting disconnection of wiring connecting the first control unit to GND (ground) is provided, and on a further condition that the disconnection detection unit detects that the wiring is not disconnected, the second control unit determines that the control of the first motor unit by the first control unit can be continued.

According to the above configuration, the disconnection detection unit detects disconnection of the wiring connecting the first control unit to the GND. The second control unit determines that the control of the first motor unit by the first control unit can be continued on the further condition that the disconnection detection unit detects that the wiring is not disconnected. Therefore, even if the first control unit and the second control unit are incapable of communicating with each other, it is possible to determine more carefully whether or not the control of the first motor unit by the first control unit can be continued.

In a seventh means, the first control unit and the second control unit transmit and receive information necessary for the cooperative control through communication, and when the first control unit and the second control unit can be communicated and cannot perform the cooperative control, the first control unit continues the control of the first motor unit and stops the control of the second motor unit by the second control unit.

Even when the cooperative control cannot be performed, the first control unit and the second control unit may be able to communicate.

According to the above configuration, the first control unit continues the control of the first motor unit and stops the control of the second motor unit by the second control unit, when the first control unit and the second control unit can communicate with each other and cannot perform the cooperative control. With such a configuration as well, when there is a risk of vibration or the like occurring in the rudder mechanism, it is possible to continue driving the rudder mechanism while suppressing the vibration or the like of the rudder mechanism.

In an eighth means, a reaction force mechanism and a turning mechanism are provided as the rudder mechanism. The first system includes a first reaction force motor unit as the first motor unit for driving the reaction force mechanism, a first reaction force control unit as the first control unit that controls the first reaction force motor unit, a first turning motor unit as the first motor unit that drives the turning mechanism, and a first turning control unit as the first control unit that controls the first turning motor unit. The second system includes a second reaction force motor as the second motor unit that drives the reaction force mechanism, a second reaction force control unit as the second control unit that controls the second reaction force motor unit, a second turning motor unit as the second motor unit that drives the turning mechanism, and a second turning control unit as the second control unit that controls the second turning motor unit.

According to the above configuration, in the rudder system including the reaction force mechanism and the turning mechanism as the rudder mechanism, the reaction force mechanism and the turning mechanism can achieve the effects of the first to seventh means, respectively.

In a ninth means, the first reaction force control unit and the second reaction force control unit transmit and receive information necessary for the cooperative control with each other through communication, and the first turning control unit and the second turning control unit transmit and receive information necessary for the cooperative control with each other through communication. When the first reaction force control unit and the second reaction force control unit are incapable of communicating with each other, the first reaction force control unit and the second reaction force control unit communicate with each other through the first turning control unit and the second turning control unit. When the first turning control unit and the second turning control unit are incapable of communicating with each other, the first turning control unit and the second turning control unit communicate with each other through the first reaction force control unit and the second reaction force control unit.

According to the above configuration, the first reaction force control unit and the second reaction force control unit transmit and receive information necessary for cooperative control by communication with each other, and the cooperative control can be performed on the first reaction force motor unit and the second reaction force motor unit. Further, the first turning control unit and the second turning control unit transmit and receive information necessary for cooperative control through communication with each other, and can perform the cooperative control with respect to the first turning motor unit and the second turning motor unit.

When the first reaction force control unit and the second reaction force control unit are incapable of communicating with each other, the first reaction force control unit and the second reaction force control unit communicate with each other through the first turning control unit and the second turning control unit. For this reason, the first reaction force control unit and the second reaction force control unit can transmit and receive the reason why communication cannot be performed, confirm that a system other than itself can continue control, and perform the cooperative control on the first reaction force motor unit and the second reaction force motor unit through the first turning control unit and the second turning control unit. Also, the same control can be performed in the first turning control unit and the second turning control unit.

In a tenth means, when the first reaction force control unit and the second reaction force control unit are incapable of communicating with each other, the first reaction force control unit and the second reaction force control unit stop the cooperative control performed by the first turning control unit and the second turning control unit. When the first turning control unit and the second turning control unit are incapable of communicating with each other, the first turning control unit and the second turning control unit stop the cooperative control performed by the first reaction force control unit and the second reaction force control unit. According to such a configuration, if one of the cooperative control performed by the first reaction force control unit and the second reaction force control unit and the cooperative control performed by the first turning control unit and the second turning control unit cannot be performed, the other of the cooperative control can also be stopped. Therefore, complexity of cooperative control can be suppressed.

An embodiment embodied in a steering system mounted on a vehicle will be described below with reference to the drawings.

As shown in FIG. 1, a steering system 100 (rudder system) is a so-called steer-by-wire steering system. That is, the steering system 100 includes a non-connected mechanism, which is a portion that is not mechanically connected to a transmission path for transmitting a driver's operation force. The steering system 100 includes a reaction force mechanism 10 that receives steering information from the driver, and a turning mechanism 20 that turns wheels 16 in accordance with an amount of steering acquired by the reaction force mechanism 10.

The reaction force mechanism 10 (the rudder mechanism) includes a steering wheel 11 rotated by a driver's operation, a steering shaft 12 rotated with the rotation of the steering wheel 11, a first reaction force motor 13A, a second reaction force motor 13B, and a reaction force reducer 14. The first reaction force motor 13A (first reaction force motor unit, first motor unit) and the second reaction force motor 13B (second reaction force motor unit, second motor unit) are connected to the steering shaft 12 via the reaction force reducer 14, and apply reaction force according to the operation of the steering wheel 11 by the driver. The reaction force reducer 14 reduces the rotational speeds of the first reaction force motor 13A and the second reaction force motor 13B and transmits them to the steering shaft 12. The first reaction force motor 13A and the second reaction force motor 13B are AC motors that are rotationally driven by AC power. Also, the first reaction force motor 13A and the second reaction force motor 13B are connected to a power supply via a first reaction force inverter 15A and a second reaction force inverter 15B, respectively. The first reaction force inverter 15A and the second reaction force inverter 15B convert DC power from the power supply into AC power, and supply power to the first reaction force motor 13A and the second reaction force motor 13B, respectively.

A pinion shaft 12a is provided at the tip of the steering shaft 12 via a clutch 12b. During normal operation of the vehicle, the clutch 12b is disengaged and the rotation of the steering shaft 12 is not transmitted to the pinion shaft 12a. For example, when the steering system 100 malfunctions, the rotation of the steering shaft 12 is transmitted to the pinion shaft 12a by engaging the clutch 12b.

The turning mechanism 20 (the rudder mechanism) includes a rack shaft 21 that changes a direction of the wheels 16, a first turning motor 22A, a second turning motor 22B, and a turning speed reducer 23. The wheels 16 are connected to both ends of the rack shaft 21 via tie rods. The first turning motor 22A (first turning motor unit, first motor unit) and the second turning motor 22B (second turning motor unit, second motor unit) are connected to the rack shaft 21 via the turning speed reducer 23, and applies a turning force that changes the direction of the wheels 16 to the rack shaft 21. The turning speed reducer 23 reduces the rotational speeds of the first turning motor 22A and the second turning motor 22B and transmits them to the rack shaft 21. The first turning motor 22A and the second turning motor 22B are connected to the power supply via the first turning inverter 24A and the second turning inverter 24B, respectively. The first turning inverter 24A and the second turning inverter 24B convert the DC power from the power supply into AC power, and supply power to the first turning motor 22A and the second turning motor 22B, respectively.

The pinion shaft 12a meshes with the rack shaft 21, and the steering shaft 12 is not mechanically connected to the rack shaft 21 when the clutch 12b is disengaged. Therefore, the rotation of the steering shaft 12 accompanying the operation of the steering wheel 11 by the driver is not converted into linear motion of the rack shaft 21. On the other hand, the steering shaft 12 is mechanically connected to the rack shaft 21 when the clutch 12b is engaged. Therefore, the rotational motion of the steering shaft 12 accompanying the operation of the steering wheel 11 by the driver is converted into the linear motion of the rack shaft 21.

The steering shaft 12 of the reaction force mechanism 10 is provided with a torque sensor 17 for detecting a steering torque Th corresponding to steering by the driver. The torque sensor 17 outputs the detected steering torque Th to the first reaction force ECU (Electronic Control Unit) 40A, the second reaction force ECU 40B, the first turning ECU 45A, and the second turning ECU 45B. Further, the rack shaft 21 of the turning mechanism 20 is provided with a rack stroke sensor 25 for detecting a displacement amount X, which is the amount of linear movement of the rack shaft 21. The rack stroke sensor 25 outputs the detected displacement amount X to at least one of the first reaction force ECU 40A, the second reaction force ECU 40B, the first turning ECU 45A, and the second turning ECU 45B.

The steering system 100 includes the first reaction force ECU 40A, the second reaction force ECU 40B, and the first turning ECU 45A and the second turning ECU 45B. Each of the first reaction force ECU 40A, the second reaction force ECU 40B, the first turning ECU 45A, and the second turning ECU 45B includes a central processing unit (CPU), a memory (ROM, RAM), an input/output interface, etc. (not shown). Power supply to the first reaction force motor 13A, the second reaction force motor 13B, the first turning motor 22A, and the second turning motor 22B is controlled by executing the program stored in the memory by the CPU. The first reaction force motor 13A, the first reaction force inverter 15A, the first reaction force ECU 40A, the first turning motor 22A, the first turning inverter 24A, and the first turning ECU 45A constitute a first system. The second reaction force motor 13B, the second reaction force inverter 15B, the second reaction force ECU 40B, the second turning motor 22B, the second turning inverter 24B, and the second turning ECU 45B constitute a second system.

The first reaction force ECU 40A (the first reaction force control unit, the first control unit) and the second reaction force ECU 40B (the second reaction force control unit, the second control unit) calculate reaction force torque command value, which is torque command value for the first reaction force motor 13A and the second reaction force motor 13B based on the reaction force side absolute angle Y1 indicating the amount of rotation (absolute angle) of the steering shaft 12 accompanying steering by the driver, the steering torque Th, and the vehicle speed Vc. Then, based on this reaction force torque command value, each of operation signals for operating the first reaction force inverter 15A and the second reaction force inverter 15B is calculated.

At this time, the first reaction force ECU 40A and the second reaction force ECU 40B communicate with each other to exchange information. The first reaction force ECU 40A and the second reaction force ECU 40B perform cooperative control to control the first reaction force motor 13A and the second reaction force motor 13B in a coordinated manner. Specifically, the first reaction force ECU 40A and the second reaction force ECU 40B transmit and receive current detection values and current command values of the first reaction force motor 13A and the second reaction force motor 13B through communication, and synchronize and drive the first reaction force motor 13A and the second reaction force motor 13B. That is, the first reaction force ECU 40A and the second reaction force ECU 40B mutually transmit and receive information necessary for cooperative control through communication. For example, one of the first reaction force ECU 40A and the second reaction force ECU 40B is set as a master and the other is set as a slave, and the slave is coordinated in accordance with a command from the master. The absolute angle is a value that indicates the rotation angle when the steering wheel 11 is set to a neutral position when the vehicle is running straight, and is a value that indicates the rotation angle when the wheel 16 is steered from this neutral position to either the left or right steering limit angle.

The first turning ECU 45A (the first turning control unit, first control unit) and the second turning ECU 45B (the second turning control unit, second control unit) calculate turning torque command value, which is torque command value for the first turning motor 22A and the second turning motor 22B based on a turning side absolute angle Y2 indicating the amount of rotation (absolute angle) of the steering shaft 12, the displacement amount X, the steering torque Th, and the vehicle speed Vc. Based on this turning torque command value, each of operation signals for operating the first turning inverter 24A and the second turning inverter 24B are calculated.

At this time, the first turning ECU 45A and the second turning ECU 45B communicate with each other to exchange information. The first turning ECU 45A and the second turning ECU 45B perform cooperative control to control the first turning motor 22A and the second turning motor 22B in a coordinated manner. Specifically, the first turning ECU 45A and the second turning ECU 45B mutually transmit and receive current detection values and current command values of the first turning motor 22A and the second turning motor 22B through communication, and synchronize and drive the first turning motor 22A and the second turning motor 22B. That is, the first turning ECU 45A and the second turning ECU 45B mutually transmit and receive information necessary for cooperative control through communication.

Further, the first reaction force ECU 40A and the first turning ECU 45A communicate with each other to exchange information. For example, the first reaction force ECU 40A and the first turning ECU 45A communicate with each other to exchange information on a state of the first reaction force ECU 40A, the first reaction force motor 13A, the first reaction force inverter 15A, the first turning ECU 45A, the first turning motor 22A, and the first turning inverter 24A, and information on their failures and abnormalities. Further, the first reaction force ECU 40A exchanges information with the second reaction force ECU 40B, and the first turning ECU 45A exchanges information with the second turning ECU 45B. The first reaction force ECU 40A and the first turning ECU 45A also transmit and receive above mentioned information acquired by the transmission/reception with each other.

Similarly, the second reaction force ECU 40B and the second turning ECU 45B communicate with each other to exchange information. For example, the second reaction force ECU 40B and the second turning ECU 45B communicate with each other to exchange information on a state of the second reaction force ECU 40B, the second reaction force motor 13B, the second reaction force inverter 15B, the second turning ECU 45B, the second turning motor 22B, and the second turning inverter 24B, and information on their failures and abnormalities. Further, the second reaction force ECU 40B exchanges information with the first reaction force ECU 40A, and the second turning ECU 45B exchanges information with the first turning ECU 45A. The second reaction force ECU 40B and the second turning ECU 45B also transmit and receive above mentioned information acquired by the transmission/reception with each other.

That is, the first reaction force ECU 40A and the second reaction force ECU 40B can communicate with each other via the first turning ECU 45A and the second turning ECU 45B. Also, the first turning ECU 45A and the second turning ECU 45B can communicate with each other via the first reaction force ECU 40A and the second reaction force ECU 40B.

A reaction force voltage sensor 41 (voltage detection unit) detects the voltage supplied to the first reaction force motor 13A. A reaction force disconnection sensor 42 (disconnection detection unit) detects disconnection of a wiring that connects the first reaction force ECU 40A to GND (ground). The reaction force voltage sensor 41 and the reaction force disconnection sensor 42 output detection results to the second reaction force ECU 40B. A turning voltage sensor 46 (voltage detection unit) detects the voltage supplied to the first turning motor 22A. A turning disconnection sensor 47 (disconnection detection unit) detects disconnection of a wiring that connects the first turning ECU 45A to GND (ground). The turning voltage sensor 46 and the turning disconnection sensor 47 output detection results to the second turning ECU 45B.

By the way, for example, even if the second reaction force motor 13B does not fail, if cooperative control for the first reaction force motor 13A and the second reaction force motor 13B cannot be performed, vibration of the reaction force mechanism 10 or locking of the reaction force mechanism 10 may occur. A failure is a state that does not work properly or does not work at all. As a case where coordinated control cannot be performed, for example, there is a case where communication between the first reaction force ECU 40A and the second reaction force ECU 40B cannot be performed, or a case where the first reaction force ECU 40A and the second reaction force ECU 40B cannot be synchronized.

Figure 2:
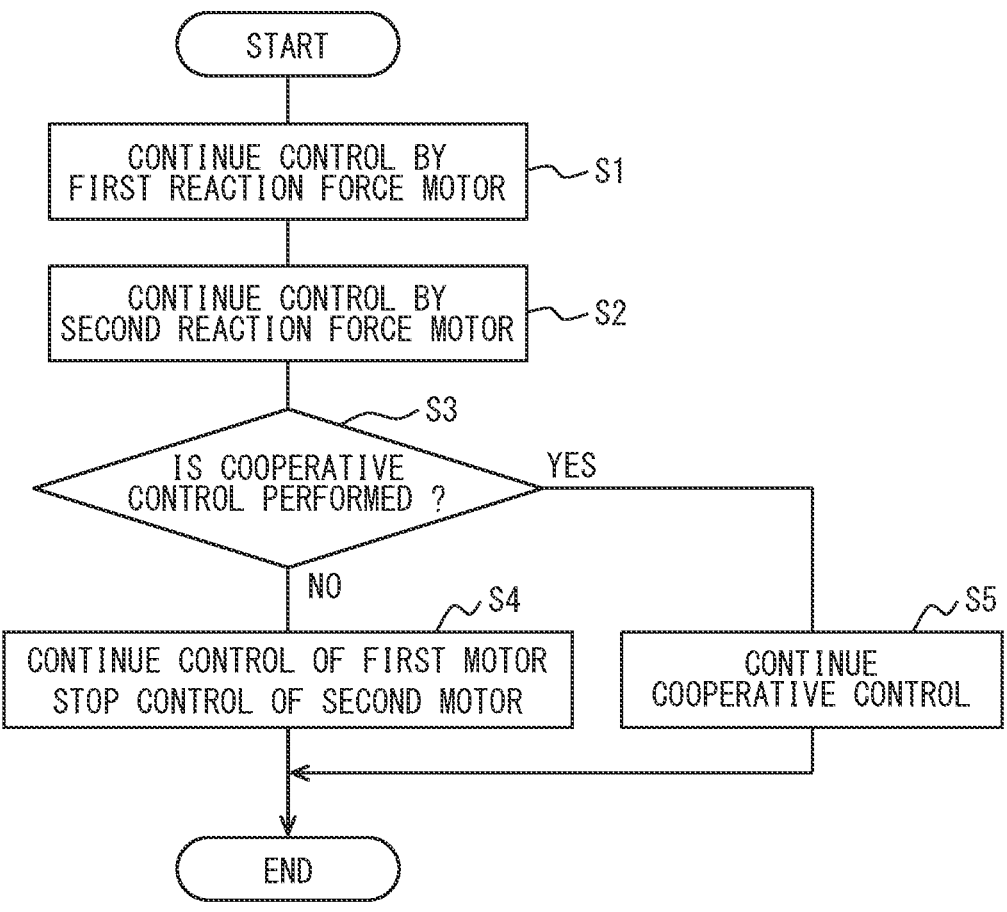
FIG. 2 is a flowchart regarding control of first and second motors.

Therefore, the following description will be made according to a flow chart shown in FIG. 2. The first reaction force ECU 40A determines that control of the first reaction force motor 13A can be continued (in step S1), and the second reaction force ECU 40B can continue control of the second reaction force motor 13B (in step S2), and whether cooperative control for the first reaction force motor 13A and the second reaction force motor 13B can be performed (in step S3). When the cooperative control cannot be performed (NO in step S3), the process proceeds to step S4. In step S4, the control of the first reaction force motor 13A by the first reaction force ECU 40A is continued, and the control of the second reaction force motor 13B by the second reaction force ECU 40B is stopped. That is, when the first reaction force ECU 40A can continue to control the first reaction force motor 13A, the second reaction force ECU 40B can continue to control the second reaction force motor 13B, and cooperative control for the first reaction force motor 13A and the second reaction force motor 13B cannot be performed, one of the control of the first reaction force motor 13A by the first reaction force ECU 40A and the control of the second reaction force motor 13B by the second reaction force ECU 40B is continued, and the other of the controls is stopped. In step S3, if cooperative control is possible, cooperative control is continued (at step S5).

Figure 3:
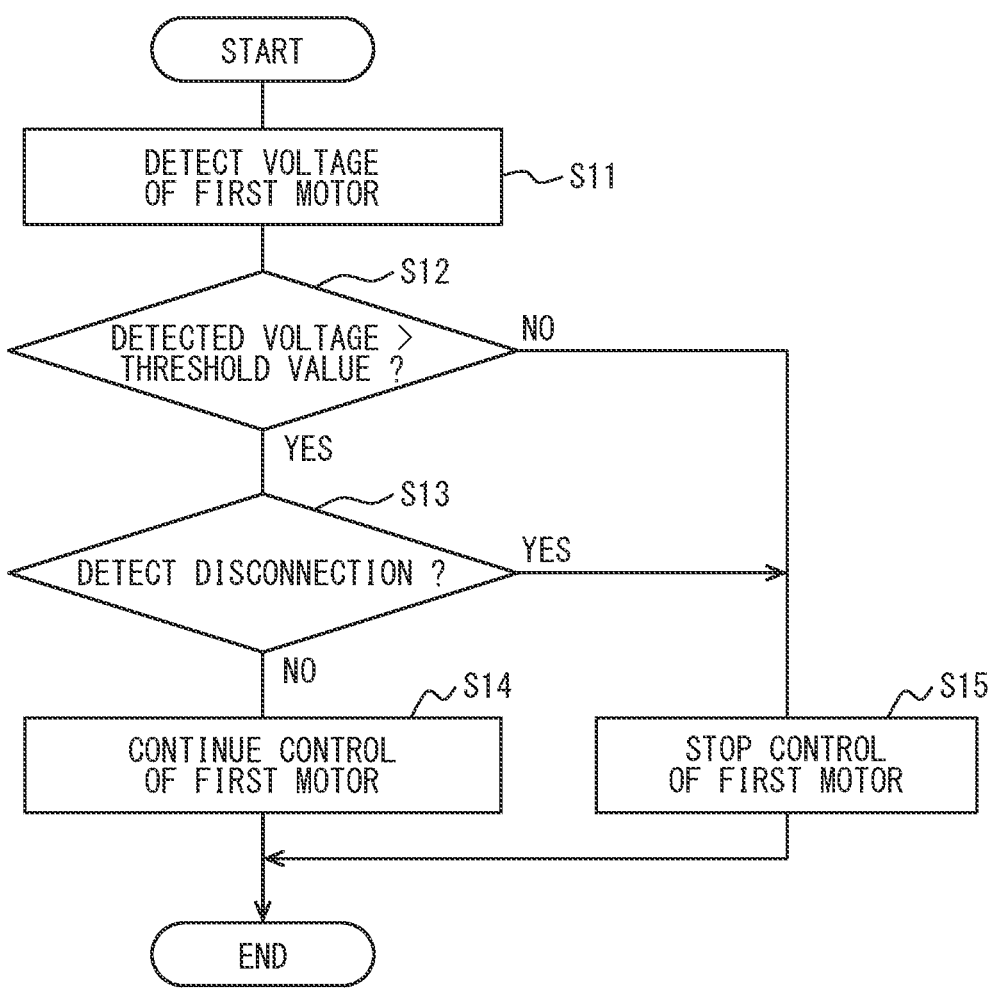
FIG. 3 is a flowchart regarding control of a first motor.

For example, when the first reaction force ECU 40A cannot communicate with the second reaction force ECU 40B, it continues to control the first reaction force motor 13A. On the other hand, on the condition that the second reaction force ECU 40B cannot communicate with the first reaction force ECU 40A and has determined that the control of the first reaction force motor 13A by the first reaction force ECU 40A can be continued, the second reaction force ECU 40B stop the control of the second reaction force motor 13B. Next, control of the first reaction force motor will be described based on a flowchart of FIG. 3. The second reaction force ECU 40B detects the voltage detected by the reaction force voltage sensor 41 (in step S11). Next, it is determined that the voltage detected by the reaction force voltage sensor 41 exceeds a threshold value (YES in step S12), and it is determined that the reaction force disconnection sensor 42 detects that the wiring is not disconnected (NO in step S13). In step S13, it is determined that the control of the first reaction force motor 13A by the first reaction force ECU 40A can be continued on condition that the wiring is not disconnected (in step S14). That is, when the first reaction force ECU 40A and the second reaction force ECU 40B cannot communicate with each other, it is predetermined to continue the control of the first reaction force motor 13A by the first reaction force ECU 40A and stop the control of the second reaction force motor 13B by the second reaction force ECU 40B. If it is determined in step S12 that the voltage detected by the reaction force voltage sensor 41 does not exceed the threshold value (NO in step S12), or if the reaction force disconnection sensor 42 determines that the wiring is disconnected (YES in step S13), the control of the first reaction force motor 13A is stopped (in step S15).

Figure 4A:
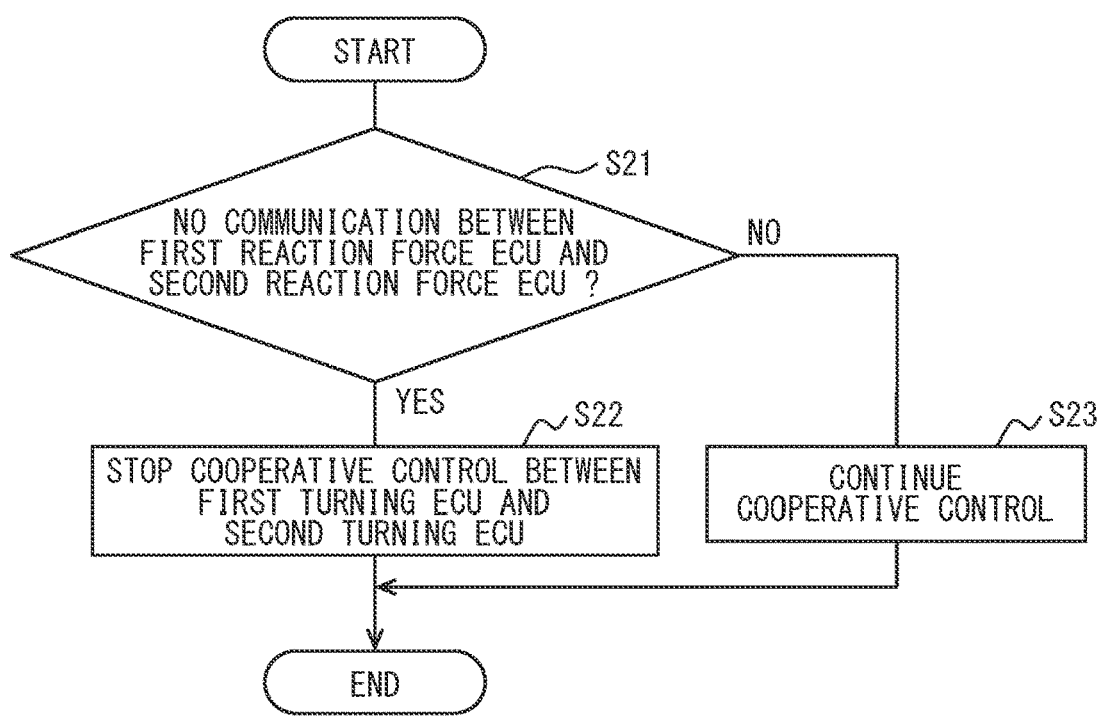
FIG. 4A is a flowchart regarding control of first and second turning control units.

Further, the following description will be made based on the flow chart of FIG. 4A. When it is determined that the first reaction force ECU 40A cannot communicate with the second reaction force ECU 40B (YES in step S21), the cooperative control by the first turning ECU 45A and the second turning ECU 45B is stopped (in step S22). Specifically, when the first reaction force ECU 40A cannot communicate with the second reaction force ECU 40B, the first reaction force ECU 40A communicates with the first turning ECU 45A to instruct the first turning ECU 45A to stop cooperative control of the first turning motor 22A and the second turning motor 22B. Further, when the second reaction force ECU 40B cannot communicate with the first reaction force ECU 40A, the second reaction force ECU 40B communicates with the second turning ECU 45B to instruct the second turning ECU 45B to stop cooperative control of the first turning motor 22A and the second turning motor 22B. That is, when the first reaction force ECU 40A and the second reaction force ECU 40B cannot communicate with each other, the first reaction force ECU 40A and the second reaction force ECU 40B stop the cooperative control of the first turning ECU 45A and the second turning ECU 45B. When it is determined that the first reaction force ECU 40A can communicate with the second reaction force ECU 40B (NO in step S21), the cooperative control is continued (in step S23).

When the cooperative control of the first turning motor 22A and the second turning motor 22B is stopped, the control of the first turning motor 22A by the first turning ECU 45A is continued, and the control of the second turning motor 22B performed by the second turning ECU 45B is stopped.

Further, when the first reaction force ECU 40A and the second reaction force ECU 40B cannot communicate with each other, the first reaction force ECU 40A and the second reaction force ECU 40B can also communicate with each other through the first turning ECU 45A and the second turning ECU 45B. Then, the first reaction force ECU 40A and the second reaction force ECU 40B mutually transmit and receive the cause (abnormality content) that the first reaction force ECU 40A and the second reaction force ECU 40B cannot communicate with each other, and may confirm that a system other than itself can continue control.

In the above description, the case where communication between the first reaction force ECU 40A and the second reaction force ECU 40B cannot be performed has been described as an example, even when the first turning ECU 45A and the second turning ECU 45B cannot communicate with each other, in each component, the term "reaction force" and the term "turning" are read interchangeably, and control is performed in the same manner.

The present embodiment described above in detail has the following advantages.

If the cooperative control cannot be performed, the control of the first reaction force motor 13A performed by the first reaction force ECU 40A and the control of the second reaction force motor 13B performed by the second reaction force ECU 40B continue, and then vibration of the reaction force mechanism 10 or locking of the reaction force mechanism 10 may occur. In this regard, when the cooperative control cannot be performed, one of the control of the first reaction force motor 13A performed by the first reaction force ECU 40A and the control of the second reaction force motor 13B performed by the second reaction force ECU 40B continues and the other of the controls stops. Therefore, it is possible to suppress the occurrence of vibration of the reaction force mechanism 10 and locking of the reaction force mechanism 10. Therefore, when cooperative control cannot be performed, the driving of the reaction force mechanism 10 can be appropriately continued.

When the first reaction force ECU 40A can continue to control the first reaction force motor 13A, the second reaction force ECU 40B can continue to control the second reaction force motor 13B, and cooperative control for the first reaction force motor 13A and the second reaction force motor 13B cannot be performed, one of the control of the first reaction force motor 13A by the first reaction force ECU 40A and the control of the second reaction force motor 13B by the second reaction force ECU 40B is continued, and the other of the controls is stopped. Therefore, when there is a possibility that the reaction force mechanism 10 is vibrated or locked, the reaction force mechanism 10 can be prevented from vibrating or being locked.

The first reaction force ECU 40A continues to control the first reaction force motor 13A when cooperative control cannot be performed. Therefore, even if cooperative control cannot be performed, the reaction force mechanism 10 can continue to be driven. On the condition that the second reaction force ECU 40B cannot perform cooperative control and has determined that the control of the first reaction force motor 13A by the first reaction force ECU 40A can be continued, the second reaction force ECU 40B stop the control of the second reaction force motor 13B. That is, if the second reaction force ECU 40B does not determine that the control of the first reaction force motor 13A by the first reaction force ECU 40A can be continued even if cooperative control cannot be performed, the second reaction force ECU 40B do not stop controlling the second reaction force motor 13B. Therefore, when cooperative control cannot be performed, it is possible to prevent the first reaction force motor 13A from performing none of the control of the first reaction force ECU 40A and the second reaction force ECU 40B from performing none of the control of the second reaction force motor 13B.

The first reaction force ECU 40A and the second reaction force ECU 40B mutually transmit and receive information necessary for cooperative control through communication. When the first reaction force ECU 40A and the second reaction force ECU 40B cannot communicate with each other, the cooperative control cannot be performed, and the first reaction force ECU 40A and the second reaction force ECU 40B cannot know whether or not the other ECU is continuing control. In this respect, when the first reaction force ECU 40A and the second reaction force ECU 40B cannot communicate with each other, the driving of the reaction force mechanism 10 can be continued while suppressing the vibration or the like of the reaction force mechanism 10.

The reaction force voltage sensor 41 detects the voltage supplied to the first reaction force motor 13A. The second reaction force ECU 40B determines that the control of the first reaction force motor 13A performed by the first reaction force ECU 40A can be continued on condition that the voltage detected by the reaction force voltage sensor 41 exceeds the threshold value. Therefore, even if the first reaction force ECU 40A and the second reaction force ECU 40B cannot communicate with each other, it is determined whether or not the control of the first reaction force motor 13A performed by the first reaction force ECU 40A can be continued.

The reaction force disconnection sensor 42 detects disconnection of the wiring connecting the first reaction force ECU 40A to GND. The second reaction force ECU 40B determines that the control of the first reaction force motor 13A performed by the first reaction force ECU 40A can be continued on the further condition that the reaction force disconnection sensor 42 detects that the wiring is not disconnected. Therefore, even if the first reaction force ECU 40A and the second reaction force ECU 40B cannot communicate with each other, it is possible to determine more carefully whether or not the control of the first reaction force motor 13A performed by the first reaction force ECU 40A can be continued.

The first reaction force ECU 40A and the second reaction force ECU 40B mutually transmit and receive information necessary for cooperative control through communication, and can perform cooperative control on the first reaction force motor 13A and the second reaction force motor 13B. Further, the first turning ECU 45A and the second turning ECU 45B mutually transmit and receive information necessary for cooperative control through communication, and perform cooperative control on the first turning motor 22A and the second turning motor 22B.

When the first reaction force ECU 40A and the second reaction force ECU 40B cannot communicate with each other, the first reaction force ECU 40A and the second reaction force ECU 40B communicate with each other through the first turning ECU 45A and the second turning ECU 45B. Then, the first reaction force ECU 40A and the second reaction force ECU 40B mutually transmit and receive the cause (abnormality content) that the first reaction force ECU 40A and the second reaction force ECU 40B cannot communicate with each other, and may confirm that a system other than itself can continue control. Also, the same control can be performed in the first turning ECU 45A and the second turning ECU 45B.

Figure 4B:
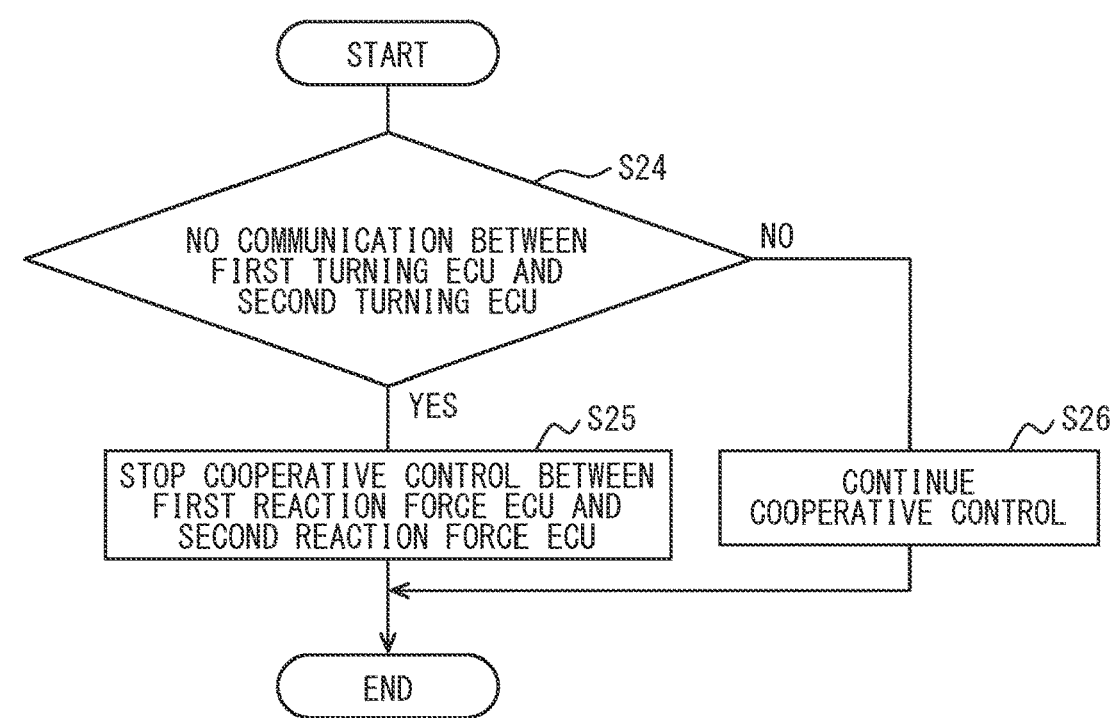
FIG. 4B is a flowchart regarding control of first and second reaction force control units.

When the first reaction force ECU 40A and the second reaction force ECU 40B cannot communicate with each other, the first reaction force ECU 40A and the second reaction force ECU 40B stop the cooperative control of the first turning ECU 45A and the second turning ECU 45B. Next, the following description will be made based on the flow chart of FIG. 4B. When it is determined that the first turning ECU 45A and the second turning ECU 45B cannot communicate with each other (YES in step S24), the first turning ECU 45A and the second turning ECU 45B stop the cooperative control performed by the first reaction force ECU 40A and the second reaction force ECU 40B (in step S25). According to such a configuration, when one of the cooperative control performed by the first reaction force ECU 40A and the second reaction force ECU 40B and the cooperative control performed by the first turning ECU 45A and the second turning ECU 45B cannot be performed, the other of the cooperative controls can be also stopped. Therefore, complexity of cooperative control can be suppressed. When it is determined that the first turning ECU 45A can communicate with the second turning ECU 45B (NO in step S24), the cooperative control is continued (in step S26).

Even when the first turning ECU 45A and the second turning ECU 45B cannot communicate with each other, in each component, the term "reaction force" and the term "turning" are read interchangeably, and control is performed in the same manner.

The above-described embodiment can be modified as follows in practical application. Elements identical to the elements of the above embodiment are designated by the same reference signs as the above embodiment, and redundant description thereof is omitted.

The reaction force disconnection sensor 42 can be omitted. In this case, the second reaction force ECU 40B determines that the control of the first reaction force motor 13A performed by the first reaction force ECU 40A can be continued on condition that the voltage detected by the reaction force voltage sensor 41 exceeds the threshold value.

The reaction force voltage sensor 41 can also be omitted. In this case, the second reaction force ECU 40B determines that the control of the first reaction force motor 13A performed by the first reaction force ECU 40A can be continued on the further condition that the reaction force disconnection sensor 42 detects that the wiring is not disconnected.

Even when the cooperative control cannot be performed, the first reaction force ECU 40A and the second reaction force ECU 40B may be able to communicate. Therefore, when the first reaction force ECU 40A and the second reaction force ECU 40B can communicate with each other and cannot perform the cooperative control, the first reaction force ECU 40A may continue to control the first reaction force motor 13A and stop the control of the second reaction force motor 13B performed by the second reaction force ECU 40B. With such a configuration as well, when there is a possibility that the reaction force mechanism 10 will vibrate or the like, it is possible to continue driving the reaction force mechanism 10 while suppressing the vibration or the like of the reaction force mechanism 10.

Further, when the first reaction force ECU 40A and the second reaction force ECU 40B cannot communicate with each other, the first reaction force ECU 40A and the second reaction force ECU 40B can also perform the cooperative control for the first reaction force motor 13A and the second reaction force motor 13B through the first turning ECU 45A and the second turning ECU 45B.

When the first reaction force ECU 40A and the second reaction force ECU 40B cannot communicate with each other, the first reaction force ECU 40A and the second reaction force ECU 40B may continue only the cooperative control performed by the first turning ECU 45A and the second turning ECU 45B. Similarly, when the first turning ECU 45A and the second turning ECU 45B cannot communicate with each other, the first turning ECU 45A and the second turning ECU 45B may continue only the cooperative control by the first reaction force ECU 40A and the second reaction force ECU 40B.

When the first reaction force ECU 40A and the second reaction force ECU 40B cannot communicate with each other, the first reaction force ECU 40A and the second reaction force ECU 40B can omit communicating with each other through the first turning ECU 45A and the second turning ECU 45B. Similarly, when the first turning ECU 45A and the second turning ECU 45B cannot communicate with each other, the first turning ECU 45A and the second turning ECU 45B can omit communicating with each other through the first reaction force ECU 40A and the second reaction force ECU 40B.

Only the reaction force mechanism 10 may be driven by two systems, and the turning mechanism 20 may be driven by one system. In this case, the control of the above embodiment should be applied only to the reaction force mechanism 10. Alternatively, only the turning mechanism 20 may be driven by two systems, and the reaction force mechanism 10 may be driven by one system. In this case, the control of the above embodiment should be applied only to the turning mechanism 20.

When the cooperative control cannot be performed, the control of the first reaction force motor 13A performed by the first reaction force ECU 40A may be stopped, and the control of the second reaction force motor 13B performed by the second reaction force ECU 40B may be continued.

The clutch 12*b* may be omitted so that the rotation of the steering shaft 12 is not transmitted to the pinion shaft 12*a*.

A plurality of torque sensors 17 and a plurality of rack stroke sensors 25 may be provided, and each control may be performed based on the detection result of each sensor of multiple system (redundant system). According to such a configuration, each control can be continued even if a part of the sensor fails or the like.

When switching from a state in which the cooperative control is performed by the first and second systems to a state in which the cooperative control cannot be performed and only the control performed by one system continues, an output torque by one system that continues control may be increased from when the cooperative control was being performed. According to such a configuration, it is possible to suppress a decrease in the output torque of the steering system 100 as a whole when switching to a state in which control by only one system is continued.

The above embodiments can be applied not only to a rudder system having two motors, but also to a rudder system that performs the cooperative control on two windings (motor unit) of a double winding motor. For example, instead of the reaction force mechanism 10 having the first reaction force motor 13A and the second reaction force motor 13B, the above embodiments can be applied to the reaction force mechanism 10 including a double winding motor having the first winding and the second winding. Similarly, instead of the turning mechanism 20 having the first turning motor 22A and the second turning motor 22B, the above embodiments can be applied to the turning mechanism 20 having a double winding motor including the first winding and the second winding.

Although the present disclosure has been described in accordance with the embodiments, it is understood that the present disclosure is not limited to the above embodiments or structures. The present disclosure encompasses various modifications and variations within the scope of equivalents. In addition, while the various combinations and configurations, which are preferred, other combinations and configurations, including more, less or only a single element, are also within the spirit and scope of the present disclosure.

The controllers and methods described in the present disclosure may be implemented by a special purpose computer created by configuring a processor programmed to execute one or more particular functions embodied in computer programs. Alternatively, the apparatuses and methods described in the present disclosure may be implemented by special purpose hardware logic circuits. Further alternatively, the apparatuses and methods described in the present disclosure may be implemented by a combination of one or more special purpose computers created by configuring a processor executing computer programs and one or more hardware logic circuits. The computer programs may be stored, as instructions being executed by a computer, in a tangible non-transitory computer-readable medium.

What is claimed is:

1. A rudder system in a steer-by-wire steering system, the rudder system comprising:

a first system including a first motor unit configured to drive a rudder mechanism and a first control unit configured to control the first motor unit; and a second system including a second motor unit configured to drive the rudder mechanism and a second control unit configured to control the second motor unit; wherein the first control unit and the second control unit perform cooperative control of the first motor unit and the second motor unit, and when the cooperative control is not performed, control of one of the first motor unit by the first control unit and the second motor unit by the second control unit continues, and control of the other of the first motor unit by the first control unit and the second motor unit by the second control unit stops, wherein the first control unit and the second control unit mutually transmit and receive information necessary for the cooperative control through communication, and the case in which the cooperative control is not performed is a case in which the first control unit and the second control unit are incapable of communicating with each other via a part other than the first control unit and the second control unit.

2. The rudder system according to claim 1, wherein when the first control unit can continue to control the first motor unit, the second control unit can continue to control the second motor unit, and the cooperative control cannot be performed, one of the control of the first motor unit by the first control unit and the control of the second motor unit by the second control unit continues, and the other of the controls stops.

3. The rudder system according to claim 1, wherein the first control unit and the second control unit mutually transmit and receive information necessary for the cooperative control through communication, and the case in which the cooperative control cannot be performed is a case in which the first control unit and the second control unit are incapable of communicating with each other, or a case where the first control unit and the second control unit cannot be synchronized.

4. The rudder system according to claim 3, wherein the first control unit continues control of the first motor unit when the cooperative control cannot be performed, and the second control unit stops controlling the second motor unit on condition that the cooperative control is determined to not be performable and that the control of the first motor unit by the first control unit can be continued.

5. The rudder system according to claim 1, wherein the first control unit and the second control unit mutually transmit and receive information necessary for the cooperative control through communication, and the first control unit continues the control of the first motor unit and stops the control of the second motor unit by the second control unit, when the first control unit and the second control unit can communicate with each other and cannot perform the cooperative control.

6. The rudder system according to claim 1, wherein the rudder system includes a reaction force mechanism and a turning mechanism, the first system includes a first reaction force motor unit as the first motor unit that drives the reaction force mechanism, a first reaction force control unit as the first control unit that controls the first reaction force motor unit, a first turning motor unit as the first motor unit that drives the turning mechanism, and a first turning control unit as the first control unit that controls the first turning motor unit, and the second system includes a second reaction force motor unit as the second motor unit that drives the reaction force mechanism, a second reaction force control unit as the second control unit that controls the second reaction force motor unit, a second turning motor unit as the second motor unit that drives the turning mechanism, and a second turning control unit as the second control unit that controls the second turning motor unit.

7. The rudder system according to claim 6, wherein the first reaction force control unit and the second reaction force control unit mutually transmit and receive information necessary for the cooperative control through communication, the first turning control unit and the second turning control unit mutually transmit and receive information necessary for the cooperative control through communication, when the first reaction force control unit and the second reaction force control unit are incapable of communicating with each other, the first reaction force control unit and the second reaction force control unit communicate with each other through the first turning control unit and the second turning control unit, and when the first turning control unit and the second turning control unit are incapable of communicating with each other, the first turning control unit and the second turning control unit communicate with each other through the first reaction force control unit and the second reaction force control unit.

8. The rudder system according to claim 7, wherein when the first reaction force control unit and the second reaction force control unit are incapable of communicating with each other, the first reaction force control unit and the second reaction force control unit stops the cooperative control performed by the first turning control unit and the second turning control unit, and when the first turning control unit and the second turning control unit are incapable of communicating with each other, the first turning control unit and the second turning control unit stop the cooperative control performed by the first reaction force control unit and the second reaction force control unit.

9. A rudder system in a steer-by-wire steering system, the rudder system comprising:

a first system including a first motor unit configured to drive a rudder mechanism and a first control unit configured to control the first motor unit; and a second system including a second motor unit configured to drive the rudder mechanism and a second control unit configured to control the second motor unit; and a voltage detection unit configured to detect voltage supplied to the first motor unit, wherein the first control unit and the second control unit perform cooperative control of the first motor unit and the second motor unit, and when the cooperative control is not performed, control of one of the first motor unit by the first control unit and the second motor unit by the second control unit continues, and control of the other of the first motor unit by the first control unit and the second motor unit by the second control unit stops, wherein the first control unit continues control of the first motor unit when the cooperative control cannot be performed, and the second control unit stops controlling the second motor unit based on determining that the cooperative control cannot be performed and that the control of the first motor unit by the first control unit can be continued, wherein the second control unit determines that the control of the first motor unit by the first control unit can be continued on condition that the voltage detected by the voltage detection unit exceeds a threshold value.

10. The rudder system according to claim 9, further comprising, a disconnection detection unit configured to detect a disconnection of wiring connecting the first control unit to ground, wherein

18 the second control unit determines that the control of the first motor unit by the first control unit can be continued on further condition that the disconnection detection unit detects that the wiring is not disconnected.

11. A rudder system in a steer-by-wire steering system, the rudder system comprising:

a first system including a first motor configured to drive a rudder mechanism and a first controller configured to control the first motor; and a second system including a second motor configured to drive the rudder mechanism and a second controller configured to control the second motor; wherein the rudder system including a processor configured to perform cooperative control to control the first motor and the second motor to cooperate, and continue one of a control of the first motor by the first controller and a control of the second motor by the second controller and stop the other of the controls, when the cooperative control is not performed, the first controller and the second controller mutually transmit and receive information necessary for the cooperative control through communication, and the case in which the cooperative control is not performed is a case in which the first controller and the second controller are incapable of communicating with each other via a part other than the first controller and the second controller.

12. The rudder system according to claim 11, wherein the first controller and the second controller mutually transmit and receive information necessary for the cooperative control through communication, and the case in which the cooperative control cannot be performed is a case in which the first controller and the second controller are incapable of communicating with each other, or a case where the first controller and the second controller cannot be synchronized.

13. The rudder system according to claim 12, wherein the first controller continues control of the first motor when the cooperative control cannot be performed, and the second controller stops controlling the second motor on condition that the cooperative control is determined to not be performable and that the control of the first motor by the first controller can be continued.

* * * * *